G. E. JONSSON.
MILKING MACHINE.
APPLICATION FILED OCT. 29, 1915.
1,363,739.
Patented Dec. 28, 1920.
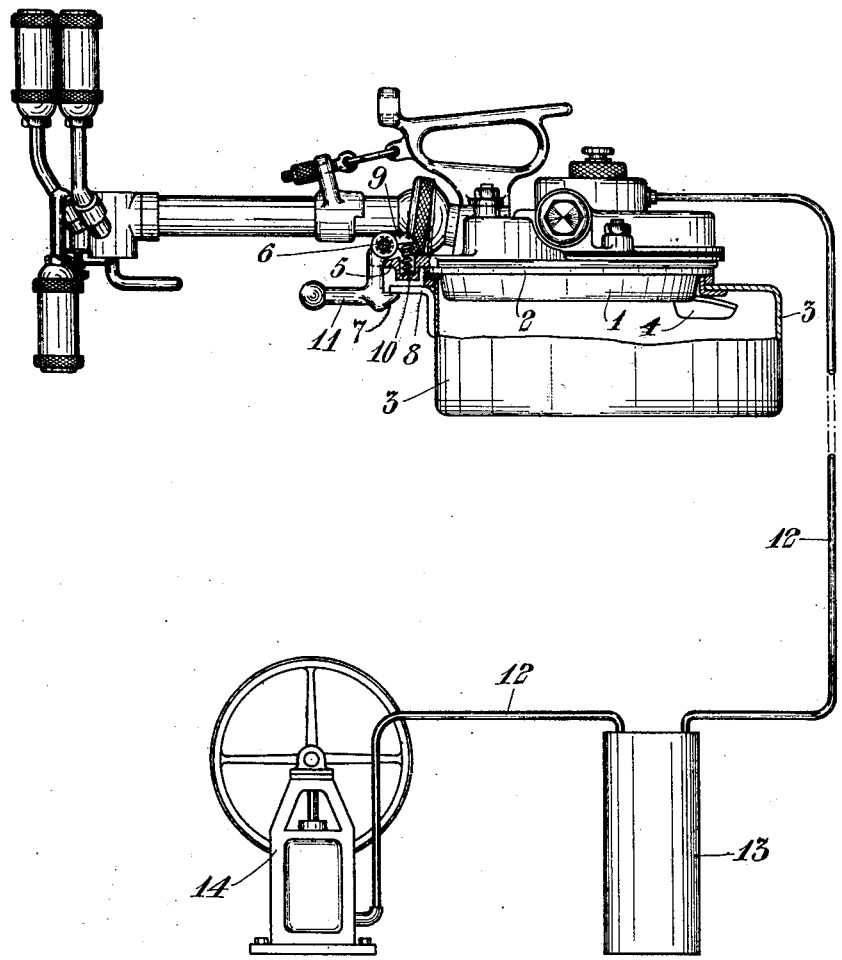
*Inventor:*
G. E. JONSSON
By George Bayard Jones
Atty.

UNITED STATES PATENT OFFICE.

GUSTAF EMIL JONSSON, OF HALMSTAD, SWEDEN, ASSIGNOR TO AKTIEBOLAGET MJÖLKNINGSMASKINEN MANUS, OF NORRKOPING, SWEDEN.

MILKING-MACHINE.

1,363,739.  Specification of Letters Patent.  Patented Dec. 28, 1920.

Application filed October 29, 1915. Serial No. 58,561.

*To all whom it may concern:*

Be it known that I, GUSTAF EMIL JONSSON, a subject of the King of Sweden, residing at Halmstad, in the Kingdom of Sweden, have invented a new and useful Improvement in Milking-Machines, of which the following is a specification.

This invention relates to an arrangement in milking machines operated by suction, by means of which the lid of the milk receptacle may be secured to or removed from the receptacle by means of a simple manipulation.

In the ordinary milking machines of this kind the milk receptacle is held to the lid by means of the vacuum inside the receptacle only. Should the vacuum for some reason or other sink so low during the milking, however, that there is not sufficient power for holding the receptacle, this would loosen and drop to the ground.

In order to remove the said disadvantage, according to the present invention the arrangement is provided, that a spring-actuated hook is hinged to the lid which hook, when the lid is secured to the receptacle, catches under and is held into engagement with a lug on the receptacle owing to the action of the spring. For the purpose of a rapid removal the hook is provided with a handle, and for rapidly securing the same with such an oblique surface that it slides against the lug and forces the hook outward into engagement with the same when the lid is being attached.

In the accompanying drawing an embodiment of the invention is illustrated.

Referring to the drawing 1 is the lower portion of the lid projecting into the milk receptacle and provided with a packing 2. The upper rim of the milk receptacle 3 bears against this packing 2. Two lugs 4 and 5 project from the lid, the lug 4 projecting into the receptacle and supporting the same. A screw 6 is journaled in two upwardly extending projections on the lug 5, a two-armed lever being pivoted on this screw. One arm of this lever is provided with a hook 7, coöperating with a lug 8 on the milk receptacle. For holding the hook in its position of engagement a spring 10 is inserted between the other arm 9 of the lever and the lug 5, which spring presses the lever arm 9 upward. In order to release the hook from engagement with the lug 8 a handle 11 is provided on the lower arm of the lever.

The attachment of the milk receptacle to the lid is effected simply by introducing the lug 4 into the receptacle, whereupon the lid is pressed downward. Owing to the oblique lower surface of the hook 7 the lower arm of the lever is then moved outward until it snaps under the lower surface of the lug 8.

A suction conduit 12 passing through an equalizer 13 and attached to the lid, connects the milking machine with the vacuum pump 14 which may be driven in any convenient manner.

The invention is not limited, however, to the special embodiment of the locking device here-in described, but the same may consist of some other suitable arrangement, for instance a bayonet-lock, the important point being that the lock shall hold the receptacle securely to the lid, and that the attachment as well as the removal may be effected by a single manipulation.

I claim:

1. In a milking machine, the combination with a supporting lid of an open top milk receptacle held beneath the same in part by suction, said receptacle having a rim adjacent the opening which is normally closed by said lid, means on said lid extending into said opening and engaging the under side of said rim to aid in supporting said receptacle, and manually operable securing means on the outside of said receptacle and lid to further secure said receptacle to said lid, said securing means being accessible to the operator without affecting the vacuum in said receptacle.

2. In a milking machine, the combination with a milk receptacle having an upper opening therein, of a lid having connections to a vacuum-producing means, a packing arranged between said receptacle and lid and surrounding said opening to provide an airtight joint when said parts are assembled, a projection extending into said opening and having positive engagement with the wall surrounding said opening to hold said parts together, and a spring catch on said lid arranged to engage a member on the outside of said receptacle opposite the interior locking means provided by said projection whereby said receptacle is held to said lid by positive fastening means aided by suction.

GUSTAF EMIL JONSSON.